United States Patent [19]
Utz

[11] 3,795,206
[45] Mar. 5, 1974

[54] PLASTIC PALETTE

[75] Inventor: Georg Utz, Bremgarten, Switzerland

[73] Assignee: Georg Utz AG, Bremgarten, Switzerland

[22] Filed: Feb. 1, 1973

[21] Appl. No.: 328,803

[30] Foreign Application Priority Data
Feb. 16, 1972 Switzerland............ 2222/72

[52] U.S. Cl. .............................. 108/51
[51] Int. Cl. .............................. B65d 19/04
[58] Field of Search .................. 248/119; 108/51–58

[56] References Cited
UNITED STATES PATENTS

| | | | |
|---|---|---|---|
| 3,187,689 | 6/1965 | Hess | 108/58 |
| 3,359,929 | 12/1967 | Carlson | 108/58 |
| 3,540,385 | 11/1970 | Hobart | 108/58 |
| 3,580,190 | 5/1971 | Fowler | 108/58 |
| 3,680,494 | 8/1972 | Giasi | 108/51 |
| 3,702,100 | 11/1972 | Wharton | 108/58 |

Primary Examiner—Paul R. Gilliam
Assistant Examiner—G. O. Finch
Attorney, Agent, or Firm—Sughrue, Rothwell, Mion, Zinn & Macpeak

[57] ABSTRACT

A molded plastic cargo handling palette comprises a plurality of relatively small, parallel box channels 9, 14, 18, 19 interconnected by straight and angled webs 20, 21. Below these upper channels and transverse thereto are three relatively large support channels 2, 3 each having two spaced reinforcing boxes 4 extending through them and aligned between adjacent support channels. The resulting palette is structurally strong and can accommodate fork lift prongs from either side.

3 Claims, 6 Drawing Figures

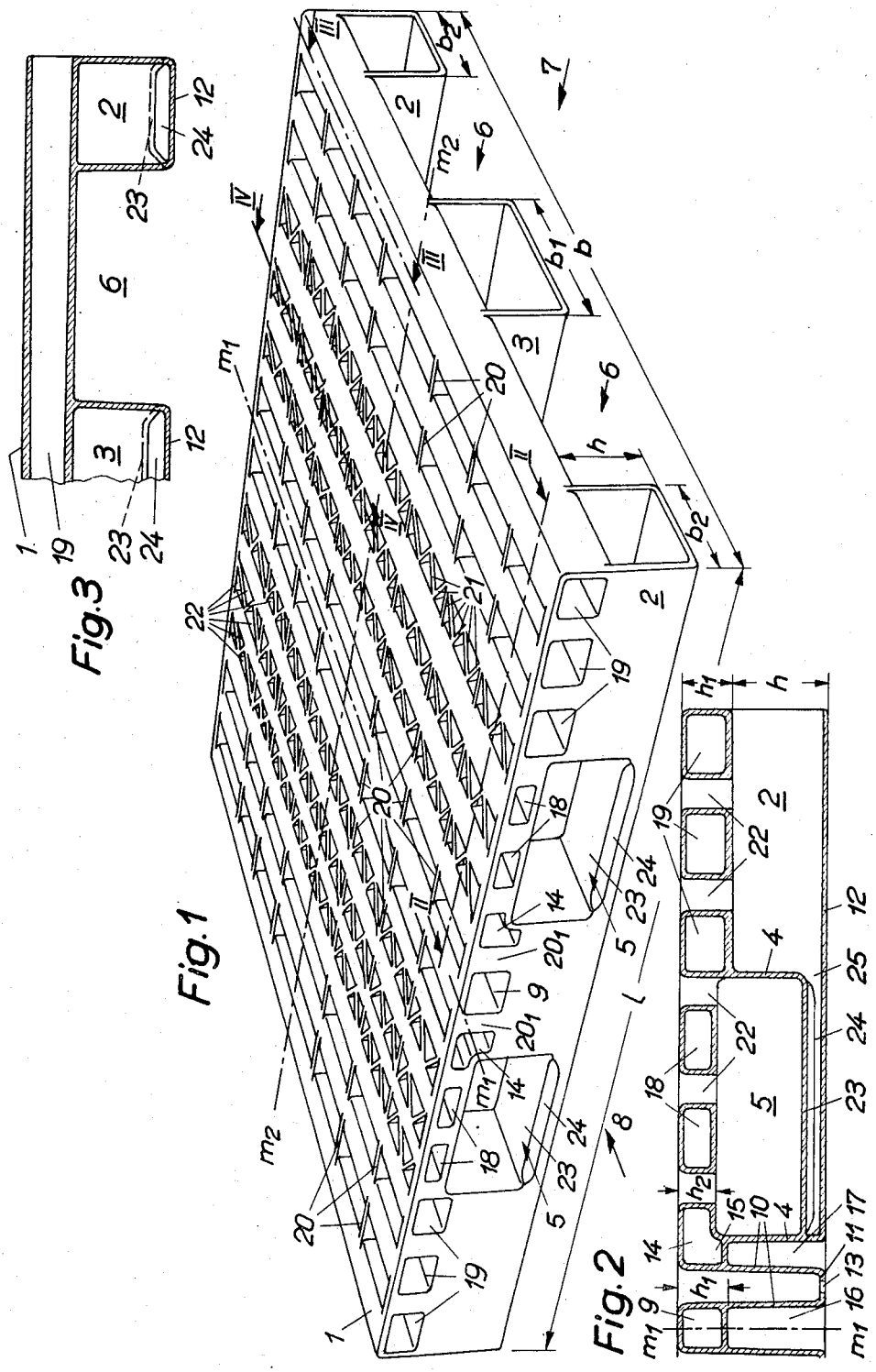

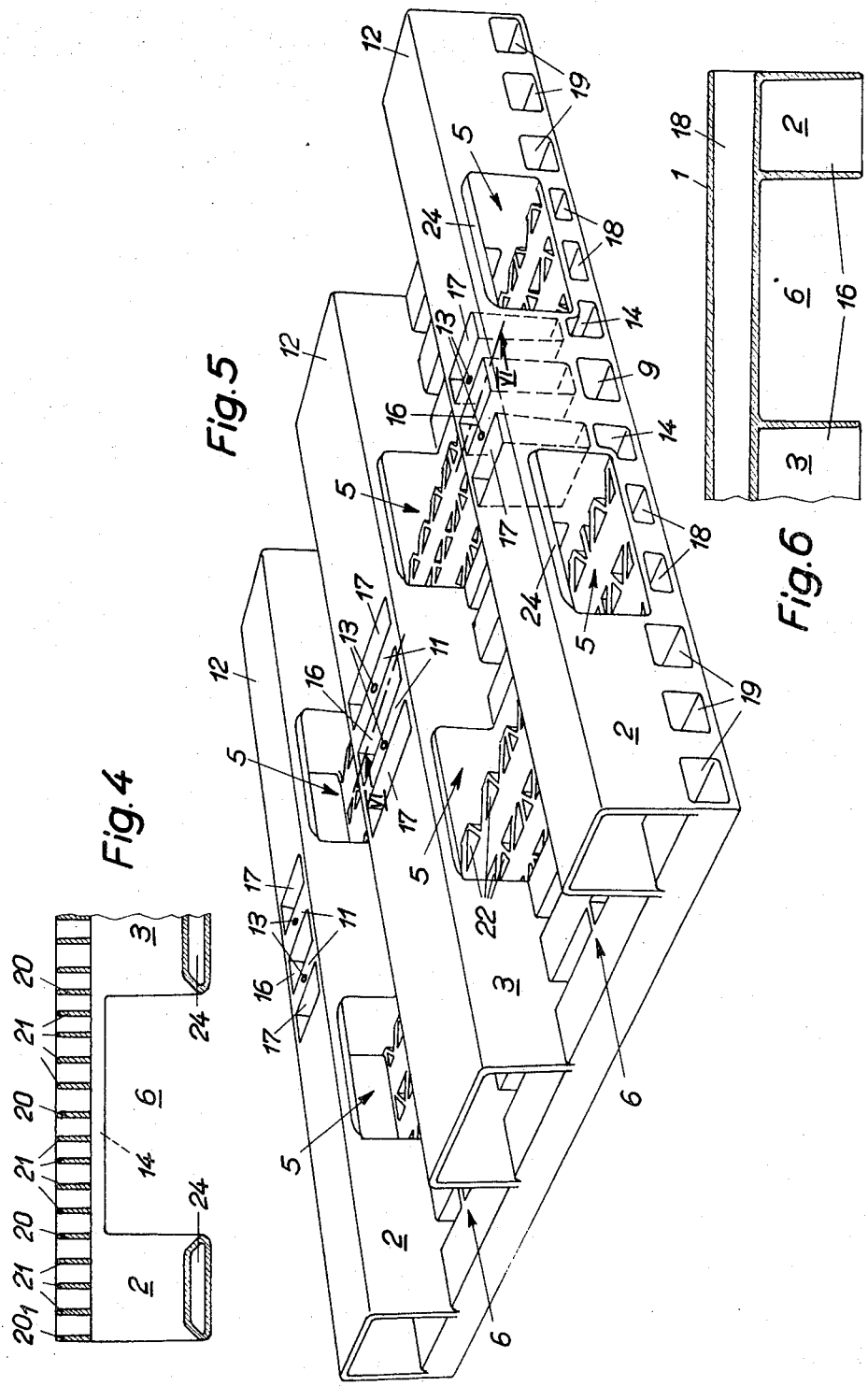

PLASTIC PALETTE

BACKGROUND OF THE INVENTION

1. Field of the Invention

The invention relates to a plastic palette having a level, rectangular, top surface.

2. Prior Art

Hitherto, only relatively small plastic palettes have been used. The reason for this is that it is difficult to produce normal-sized palettes, i.e., those having a loadable surface of 120 × 80 cm. without considerable outlay on costly plastics material. Profilated supports having an open section, more particularly a U-section, having already been used in the construction of paletes,to increase the stability of the same. To produce an entire palette in a single injection molding process, these supports have been arranged in a staggered manner along the top surface and the base. This known palette, which is disclosed, for example, in the Swiss patent 477,328, has the disadvantage that it is relatively difficult to clean and that it is not as stable as it might be.

SUMMARY OF THE INVENTION

The object of the invention is to overcome these disadvantages. Accordingly, the palette according to the invention is characterized in that the top surface is formed from the upper surfaces of a plurality of hollow traverse supports and the bars connecting together the narrow sides of these supports. Three longitudinal supports are arranged below these traverse supports; the lower surfaces of these longitudinal supports forming the base of the palette. Two continuous channels, open at the bottom, are formed between these three longitudinal supports. Two box-type reinforcements are provided in each longitudinal support. Each of these reinforcements limits one of the channels crossing the longitudinal support, thus forming two rows of three channels in alignment with each other. This palette also has the advantage that it can be raised by a fork lift in the longitudinal and cross direction. A single embodiment can also be produced in a single injection molding process.

A preferred embodiment of the invention is shown in the drawings in which:

BRIEF DESCRIPTION OF THE DRAWINGS

FIG. 1 shows a prespective,top view of the palette,

FIG. 2 is a vertical section according to the arrows II—II of FIG. 1.

FIG. 3 is a vertical section according to the arrows III—III of FIG. 1,

FIG. 4 is a vertical section according to the arrows IV—IV of FIG. 1,

FIG. 5 is a perspective view of the base of the palette, and,

FIG. 6 is a vertical section according to the arrows VI—VI of FIG. 5, but with the top surface facing upwards — as in FIG. 1.

DESCRIPTION OF THE PREFERRED EMBODIMENTS

The palette represented has an upper, rectangular top surface 1. The length 1 of this palette is 120 cm and the width $b$ is 80 cm. Thus it is the same size as a normal palette. The palette, which is of symmetrical construction with regard to its two median planes $m_1 - m_1$ and $m_2 - m_2$, has two longitudinal supports 2 and a central longitudinal support 3. All the longitudinal supports 2 and 3 are hollow and have an essentially rectangular section of the same outer height $h$. The width $b_1$ of the middle support 3 is greater than the width $b_2$ of the two side supports 2. The longitudinal supports 2 and 3 are not completely hollow with a constant section, but have breaks where they are each interrupted by two box-like reinforcements 4. The two reinforcements form the channels 5, of rectangular section, crossing the longitudinal supports 2,3. The six channels 5 of the three longitudinal supports 2 and 3 are aligned with each other in two rows, each consisting of 3 channels. This is best illustrated by FIG. 5. FIG. 5 also shows that two bottomless, continuous, longitudinal channels 6 are provided between the middle support 3 and the two side supports 2. If a fork lift moving in a longitudinal direction according to the arrow 7 of FIG. 1, is to pick up the palette, the two prongs of its lifting fork may be introduced as far as desired into the longitudinal channels 6. If, on the other hand, the fork lift is moving in the transverse direction according to the arrow 8, the two fork prongs can also be introduced as far as desired into the two rows of channels 5, 5, 5, and 5, 5, 5.

A cross support 9 having a rectangular section, extends across the longitudinal supports 2, 3, 2 in the transverse plane of symmetry $m_1 - m_1$. The outer height of this cross support 9 is designated by $h_1$. A downwardly projecting, hollow cross rib 10 is provided on each side of the middle cross support 9 in the region of each longitudinal support 2,3. The back 11 of the hollow cross rib 10 helps form the standing surface 12 of the relevant longitudinal support 2 (or 3). It is also provided with at least one opening 13 for discharging any liquid, which might penetrate into the hollow rib 10. A hollow cross support 14 having a rectangular cross section is next to the rib 10. The outer height of this cross support 14 is designated by $h_2$. The section of the support 14 has a downwardly projecting bulge 15 adjacent to which is the box-like reinforcement 4. The base 12 of the longitudinal support 2 or 3 is provided with rectangular slits 16 or 17 below the central cross support 9 and the bulges 15. Two hollow cross supports 18 having a rectangular cross-section and an outer height $h_2$ are provided above the box-like reinforcement 4. These hollow cross supports 18 form the upper wall of the cross channels aligned with each other 5, 5, 5; $h_2$ being less than to $h_1$. Three hollow cross supports 19 are adjacent to the two cross supports 18. The outer height of these cross supports 19 is also $h_1$. The last cross support 19 forms the edge of the top surface 1, which is formed from the upper surfaces of all the cross supports 9, 14, 18 and 19, and from the upper, narrow sides of the bars 20 and 21, which connect these cross supports together. The cross supports 20 run in a longitudinal direction and, together with the end bars $20_1$, connect together the cross supports 19. They also connect together the cross support 9 with the two adjacent cross supports 14. Apart from being connected by the cross bars 20 and $20_1$, the two cross supports are connected to each other and to the adjacent cross supports 14 or 19, in a frame-like manner, by the cross bars 21, which are arranged at an angle of 60° to the cross direction, thus forming vertical, continuous, cavities 22 having a triangular cross section. A flat pocket 24 extends in the longitudinal direction of the relevant longitudinal support 2 or 3 between the base 23 of the box-like reinforcement 4 and the base of the longitudinal support 2 or 3. The opening 25 in the pocket is located at the end facing away from the middle plane $m_1 - m_1$. The sum of the outer cross-sectional heights $h + h_1$ of the longitudinal supports 2 and 3 and the outer cross supports 19 is equal to the total height of the palette, e.g., 15 cm.

The advantage of the palette represented over known plastic palettes is that it is made of hollow longitudinal and cross supports instead of open section supports, more particularly U-supports. This not only improves the stability of the palette but it also renders it substantially easier to clean. It is also possible to introduce the lifting fork of a fork lift approaching the palette in a longitudinal or a cross direction, as far as desired beneath the palette. Furthermore, it is possible to produce the palette in a single injection molding process. Further observation of the palette will show that the mold can be composed of a plurality of shells, an upper and a lower shell part, and multipart core. All the core parts project with a constant or inwardly decreasing cross section, from the shell parts inwards into the inside of the mold in a longitudinal, transverse, or elevational direction. This makes it possible for the shell parts to be dismantled first after the injection process. All the core parts may be removed subsequently from the cavities of the finished palette.

What is claimed is:

1. A plastic palette having a level, rectangular top surface, characterized in that it is of a symmetrical construction with respect to two vertical, perpendicular, central planes ($m_1 - m_1$; $m_2 - m_2$); in that the top surface is made up of the upper surfaces of a plurality of hollow cross supports (9, 14, 18, 19) and the narrow sides of the bars (20, 21) connecting the same; in that three lower cross supports (14, 18, 18) and then three higher cross supports (19) are provided on each side of a central cross support located in the cross plane of symmetry ($m_1 - m_1$); in that three hollow, longitudinal supports (2, 3, 2) are arranged below these cross supports, the lower surfaces of said longitudinal supports (2, 3, 2) forming the base of the palette, and providing between them two continuous channels (6), which are open at the bottom; in that two box-like reinforcements (4) are provided in each longitudinal support, said reinforcements (4) each limiting one of the channels (5) crossing the longitudinal support, thus forming two rows (5, 5) each consisting of three channels aligned with each other; in that the hollow interiors of the cross supports and longitudinal supports extends inwards from without and have an inwardly decreasing section.

2. A palette according to claim 1, characterized in that a downwardly inclined hollow rib (10) is provided in the region of each longitudinal support (2, 3) between the central cross support (9) and the adjacent lower cross support (14), the back part (11) of said rib helping to form the base (12) of the relevant longitudinal support, and having at least one opening (13).

3. A palette according to claim 1, characterized in that a shallow pocket (24) having an opening (25) facing away from the plane of symmetry ($m_1 - m_1$) is provided between the base (23) of the box-like reinforcement (4) and the base of the longitudinal support (2, 3).

* * * * *